United States Patent [19]
Berkey et al.

[11] Patent Number: 5,251,276
[45] Date of Patent: Oct. 5, 1993

[54] ENVIRONMENTALLY ROBUST FIBER OPTIC COUPLER AND METHOD

[75] Inventors: George E. Berkey, Pine City; William J. Miller, Corning, both of N.Y.

[73] Assignee: Corning Incorporated, Corning, N.Y.

[21] Appl. No.: 913,622

[22] Filed: Jul. 16, 1992

[51] Int. Cl.⁵ .............................................. G02B 6/255
[52] U.S. Cl. ........................................ 385/43; 385/51; 385/80
[58] Field of Search ..................... 385/39, 42, 43, 46, 385/47, 48, 51, 54, 55, 78, 80, 84, 85, 89, 96, 115

[56] References Cited

U.S. PATENT DOCUMENTS

| | | | |
|---|---|---|---|
| 4,431,260 | 2/1984 | Palmer | 385/51 |
| 4,861,127 | 8/1989 | Failes | 385/51 |
| 4,906,068 | 3/1990 | Olson et al. | 385/43 |
| 5,009,692 | 4/1991 | Miller et al. | 65/3.11 |
| 5,011,251 | 4/1991 | Miller et al. | 385/43 |
| 5,044,716 | 9/1991 | Berkey | 385/51 |
| 5,131,735 | 7/1992 | Berkey et al. | 385/43 |
| 5,148,508 | 9/1992 | Anjan et al. | 385/51 |
| 5,179,603 | 1/1993 | Hall et al. | 385/24 |

*Primary Examiner*—Frank Gonzalez
*Attorney, Agent, or Firm*—W. J. Simmons, Jr.

[57] ABSTRACT

A fiber optic coupler is formed by inserting a plurality of optical fibers into the longitudinal bore of a glass tube so that at least a portion of each fiber extends from at least one end of the tube. The midregion of the tube is collapsed onto the fibers, uncollapsed bore portions remaining at the tube end regions. Each bore portion is connected to the tube end surface by a funnel that facilitates the fiber insertion step. The central portion of the midregion is stretched to reduce the diameter thereof. In a first embodiment, glue is applied to the funnel. Before the glue is cured, a sufficient period of time is allowed to elapse to permit said glue to flow by capillary action between the fibers and the adjacent portion of the wall of the bore portion. The glue flows at least 3 mm into the bore portion beyond the bottom of the funnel. The glue that flows by capillary action fails to completely surround the fibers with glue. The glue is then cured. In a second embodiment, a hollow filament is inserted into the uncollapsed bore portion and a vacuum is applied to the filament. Glue, which is applied to the funnel, is drawn into the uncollapsed bore portion due to the evacuated condition thereof, thus filling the uncollapsed bore portion to the desired level.

17 Claims, 2 Drawing Sheets

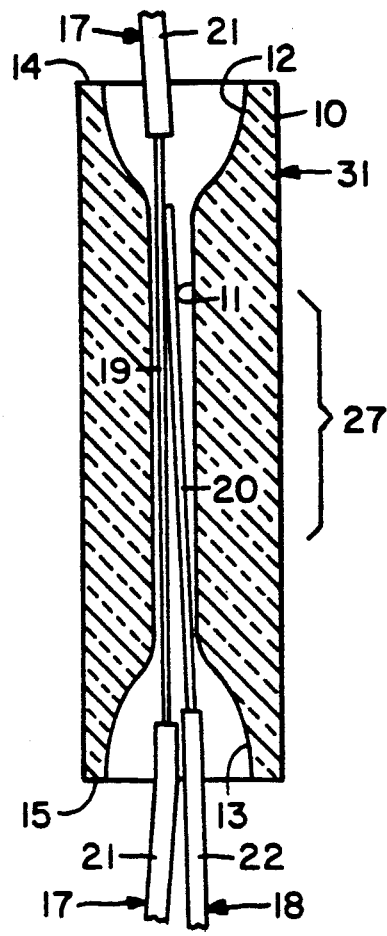
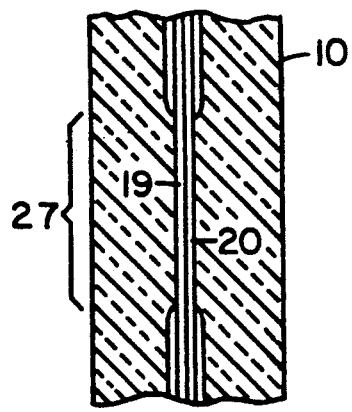
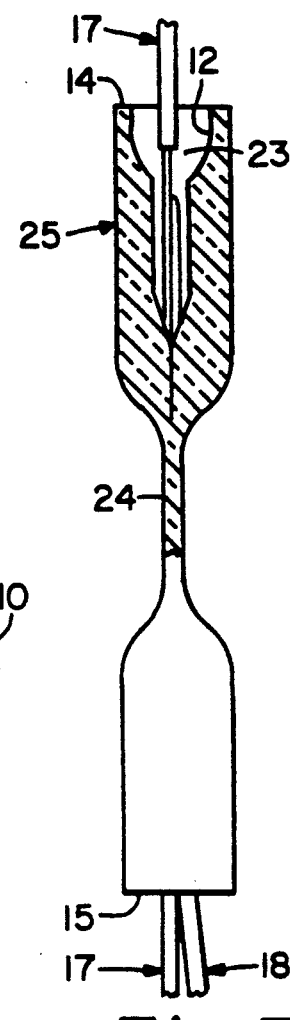
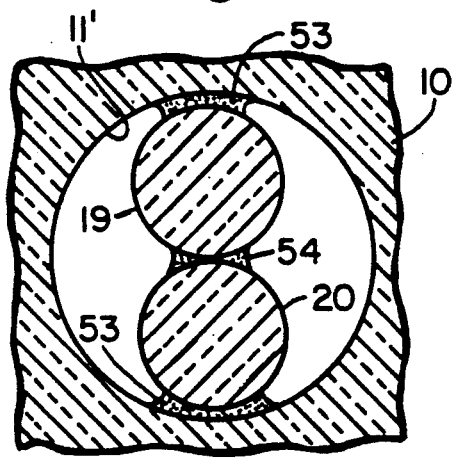
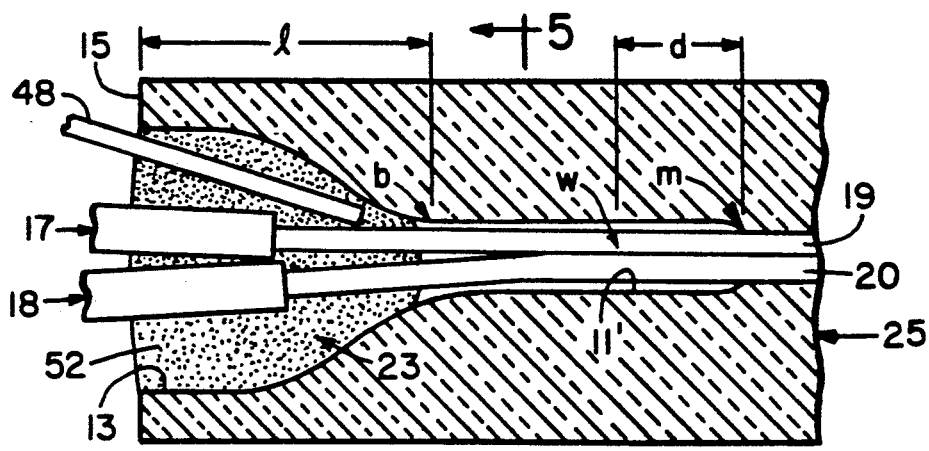
Fig. 1
Fig. 2
Fig. 5
Fig. 3
Fig. 4

ENVIRONMENTALLY ROBUST FIBER OPTIC COUPLER AND METHOD

BACKGROUND OF THE INVENTION

This invention relates to overclad fiber optic couplers that are capable of withstanding relatively wide temperature excursions and to a method of making them.

Fiber optic couplers referred to as "fused fiber couplers" have been formed by positioning a plurality of fibers in a side-by-side relationship along a suitable length thereof and fusing the claddings together to secure the fibers and reduce the spacings between the cores. Various coupler properties can be improved by encapsulating the coupling region of the fibers in a matrix glass to form an "overclad coupler". Portions of the fibers to be fused are inserted into a glass tube having a refractive index lower than that of the fiber claddings. The tube has a longitudinal bore, each end of which is connected to the tube end surfaces by a funnel that facilitates the insertion of the fibers. The tube midregion is collapsed onto the fibers; the central portion of the midregion is then drawn down to that diameter and coupling length which is necessary to obtain the desired coupling. After the coupler has cooled, a drop of glue is applied to each funnel to increase the pull strength of the fibers.

The collapsing of the tube midregion causes the optical fibers just outside the collapsed region to be weakened. This weakened region occurs about 5 mm from the fully collapsed region in the uncollapsed portion of the bore. Under severe thermal cycling (for example, cycling a coupler between −60° C. and 125° C.) the weakened region of the fibers has been known to break, primarily because of a thermal coefficient of expansion mismatch between the glue and the glass coupler components. Because of the angle of the funnel walls with respect to the bore axis, this thermal expansion mismatch causes the glue in the funnel to expand longitudinally outwardly and pull the fibers embedded therein away from the collapsed midregion, thereby stressing the fibers.

Heretofore, the filling of the cavity space with glue has been considered to be desirable, but the air trapped inside the tube bore has kept the glue from penetrating into the bore. A technique for increasing the depth of penetration of the glue into the uncollapsed portion of the tube bore is disclosed in U.S. Pat. No. 5,009,692. A drop of glue is applied to an end of the coupler tube. Heat is applied locally to a lateral end region of the tube in the vicinity of the uncollapsed bore. As the air within the bore becomes heated, it expands and is driven from the bore, causing bubbles to pass through the glue. After the heat source is removed, the air remaining in the bore cools and draws the glue a short distance into the bore. However, the technique of heating the tube and then allowing the glue to be drawn into the bore does not cause the glue to consistently flow far enough into the bore to adequately cover or relieve stress from the weakened region of the fibers.

It is noted that fully filling the funnel and the uncollapsed portion of the bore with glue would be effective in reducing harmful stresses that otherwise would be applied to the fibers only if the glue is azimuthally homogeneous with respect to the fibers. The presence of a large void in the glue can cause the fibers to be stressed.

SUMMARY OF THE INVENTION

It is therefore an object of the present invention to provide a method of making robust overclad fiber optic couplers which can reliably withstand temperature extremes and mechanical influences such as pulling on the fiber pigtails extending therefrom. Another object is to provide a reproducible method of making fiber optic couplers that relies less on the judgment of the technician making the coupler. A further object is to provide a fiber optic coupler producing method in which glues having a wide variety of viscosities can be employed to secure the fibers to the overclad tube.

In the method of making a fiber optic coupler, an intermediate product is initially formed. The intermediate product is composed of a plurality of contiguously extending optical fibers that extend through a coupling region and through the bore of a tube situated longitudinally adjacent the coupling region. The fibers are fused together in the coupling region, the diameters of the fibers in the coupling region being smaller than the diameters thereof in the tube. The fibers are surrounded with a drop of glue at that end of the tube bore opposite the coupling region, the small diameter of the bore inhibiting the filling of the bore with glue. In accordance with one aspect of the invention a sufficient period of time is allowed to elapse to permit the glue to "wick" or flow by capillary action between at least one of the fibers and the adjacent wall of the bore to form a bead that extends at least 3 mm from the drop of glue into the bore. Thereafter, the glue is cured.

The bore is commonly connected to the end of the tube by a funnel that facilitates fiber insertion into the small diameter bore. When such a tube is employed, the drop of glue is placed in the funnel. In a conventional coupler wherein the bore extends about 10 mm from the bottom of the funnel to the coupling region, the bead extends at least 30% of the total distance from the bottom of the funnel to that end of the bore adjacent the coupling region.

In accordance with another aspect of the invention, the uncollapsed bore portion is evacuated, and the applied glue is drawn into the uncollapsed bore portion due to the evacuated condition thereof. The bore can be evacuated by inserting a hollow filament into the uncollapsed bore portion and evacuating the filament. The glue could be drawn down to some point in the uncollapsed bore by vacuum and allowed to flow an additional distance by wicking. Alternatively, the evacuated hollow filament could draw the glue to some point in the bore, such as the bottom thereof, and the glue could be immediately cured.

The resultant fiber optic coupler comprises a plurality of contiguously extending optical fibers which extend through the coupling region and through the bore of the tube that is situated longitudinally adjacent the coupling region. The fibers are fused together in the coupling region where their diameters are smaller than they are in the tube. A drop of glue completely surrounds the fibers at that end of the tube bore opposite the coupling region. A bead of glue extends between at least one of the fibers and the adjacent wall of the tube bore, the bead extending at least 3 mm from the drop of glue into the bore.

BRIEF DESCRIPTION OF THE DRAWINGS

FIG. 1 is a cross-sectional view of a capillary tube after optical fibers have been inserted therein.

FIG. 2 is a partial cross-sectional view illustrating the collapse of the glass tube around the fibers to form a solid midregion.

FIG. 3 is a partial cross-sectional illustration of a fiber optic coupler after it has been drawn down.

FIG. 4 is a cross-sectional view of an end region of the coupler of FIG. 3 after glue has been injected into the funnel.

FIG. 5 is a partial cross-sectional view taken along lines 5—5 of FIG. 4 after glue has wicked down the optical fibers.

DETAILED DESCRIPTION

The drawings are not intended to indicate scale or relative proportions of the elements shown therein.

Figure 7:
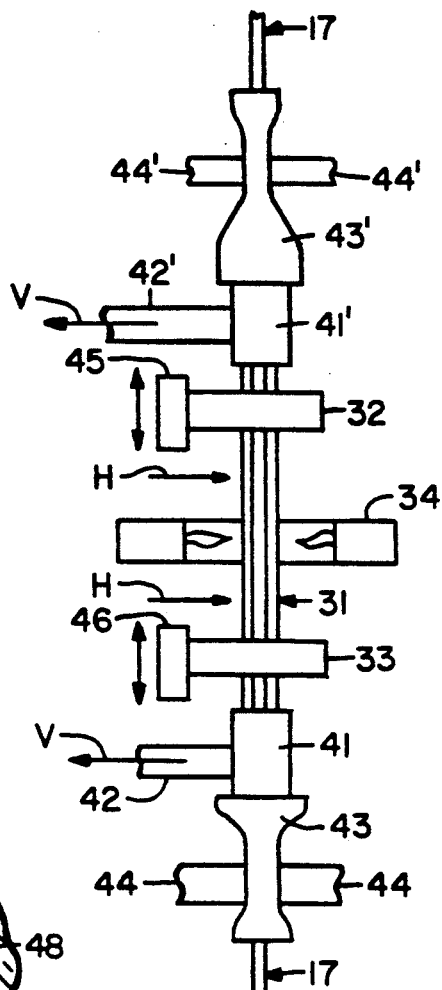
FIG. 7 is a schematic illustration of an apparatus for collapsing a capillary tube, stretching the midregion thereof, and optionally supporting it during the glue application process.

Overclad fiber optic couplers can be formed by the method disclosed in U.S. Pat. No. 5,011,251, which is incorporated herein by reference. The $1 \times 2$ coupler described herein is deemed to be typical of $M \times N$ couplers, where $M \geq 1$ and $N \geq 2$. Protective coating material 21, 22 is stripped from the appropriate portions of coated optical fibers 17 and 18 (FIG. 1), and they are threaded into the longitudinal bore 11 of capillary tube 10, the uncoated fiber portions 19 and 20 extending through tube midregion 27. Tube 10 is preferably composed of silica doped with $B_2O_3$ and optionally fluorine. It can be made softer by adding a dopant such as $GeO_2$ and adjusting the refractive index by adding additional $B_2O_3$. Funnels 12 and 13 form entrances to bore 11 at end surfaces 14 and 15 to facilitate fiber insertion. Midregion 27 is collapsed onto the fibers (FIG. 2). At least the central portion of midregion 27 is heated and stretched to reduce its diameter, thereby forming an intermediate product 25 having a drawn down region 24 (FIG. 3). A cavity 23, which consists of the uncollapsed end of bore 11 along with the respective funnel, exists at each end of the coupler. The coupler optionally remains in the apparatus of FIG. 7 for support during the glue application process.

It has been conventional practice to place a drop of glue in each funnel to increase the pull strength of the optical fiber pigtails extending from the ends of the coupler. Because of the small diameter of the bore 11 portion of cavities 23, the glue usually extends no deeper than the bottom b of funnel 23. If the tube did not have funnels, the drop of glue would be placed at the end of the tube.

In accordance with one aspect of the present invention, the stressing of the weakened portions of the fibers is reduced or eliminated by applying the glue in accordance with the process shown in FIGS. 4 and 5 whereby it "wicks" down the wall of the funnel and bore adjacent the optical fibers. As shown in FIG. 4, weakened region w of the fibers is located a distance d (about 5 mm) from the end of the collapsed midregion. If a high viscosity glue is employed, the ends of tube 10 can be heated by means such as a heat gun (see arrows H of FIG. 7) either before or after the glue is applied to reduce its viscosity and thus facilitate the flow of glue into the cavity. If the process employs certain glues that can be degraded by overheating, the tube is preferably heated before the glue is applied, the tube temperature being less than that which would degrade the glue. A syringe is filled with glue, and its applicator needle 48 is inserted into funnel 13. A sufficient amount of glue is injected into the funnel to cover the bare regions of the fibers that extend into the funnel. The glue preferably extends to the bottom b of the funnel. Care should be taken to minimize the formation of entrapped bubbles. If the tube has funnels, the glue is preferably confined to funnel 13, rather than allowing it to flow over end surface 15. A meniscus may form at the fibers. Fibers should be maintained separate from one another and not glued together beyond end surface 15 of the tube except by the applied drop of glue. The glue application process is repeated at the other end of the tube. Before the glue is cured, a sufficient amount of time is allowed to pass to enable the glue to "wick" down the wall of the funnel and bore adjacent the optical fibers.

By "wick" is meant that the glue flows by capillary action between each fiber and the adjacent surface of the bore to form elongated beads 53 which affix the fibers to the tube wall that forms bore 11', thereby transferring externally and internally generated loads from the fibers to the tube. Glue should wick at least 3 mm beyond funnel bottom b into bore 11'. A distance of 3 mm is sufficient to transfer most of the pulling force from the fiber to the wall of the tube bore. The bore depth is usually relatively short since it is desireable to minimize the total length of the coupler. In a commercial embodiment of the coupler disclosed herein, the bore extends about 10 mm from the bottom of the funnel to the coupling region. In that coupler, the bead should extend at least 30% of the total distance from the bottom of the funnel to that end of the bore adjacent the coupling region. The wicking process may also result in the flow of glue between adjacent fibers to form bead 54. Wicking time depends on such parameters as the temperature of coupler tube, the viscosity of glue and the depth of uncollapsed bore.

In certain $1 \times N$ couplers (e.g. a $1 \times 6$ power splitter) in which one fiber is surrounded by a plurality of ring fibers in the coupling region, the central fiber cannot be attached to the tube wall by a bead of glue since the central fiber is too remote from the wall. In such a coupler, the bead of glue is disposed between the wall of the tube bore and at least one and preferably all of the ring fibers that are disposed adjacent the bore.

After sufficient time has passed for the required wicking to occur, the glue is cured by ultraviolet light, heat or the like, and the coupler body is released from the chucks.

Before the application of glue 52, that portion of optical fiber 17 extending from end 14 can be connected to a light source, and fibers 17 and 18 extending from end surface 15 can be connected to light detectors. The signals from the light detectors can be noted before and after gluing so that changes due to gluing and/or unclamping can be ascertained.

Fiber optic couplers made in accordance with the method of FIGS. 1-5 have shown excellent mechanical thermal performance. The thin bead of glue between the fibers and the tube wall is resistant to delamination during temperature changes, thus providing the fiber pigtails with high pull strength. Also, computer modeling has been used to analyze the stress to which the fibers are subjected under different conditions of gluing. The model predicts that fibers would be subjected to less stress if the glue has wicked down the fibers as shown in FIG. 5 than if the bore were completely filled with glue.

It is preferred that the axial length l of the funnels be as small as possible in order to minimize glue volume. This minimizes the total movement of the glue in the funnel and it minimizes the amount of longitudinal movement of a fiber disposed in that glue as a result of temperature change. However, length l must be sufficiently great to facilitate the placement of the fiber coatings 21 and 22. If the funnel is very short, it is difficult for the operator to position the fiber coatings in their proper longitudinal position.

Figure 9:
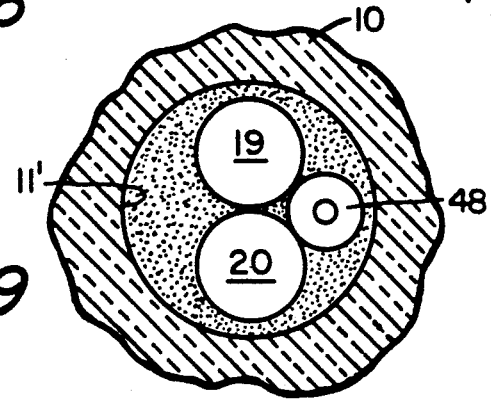
FIG. 9 is a partial cross-sectional view taken along lines 9—9 of FIG. 8.
Figure 8:
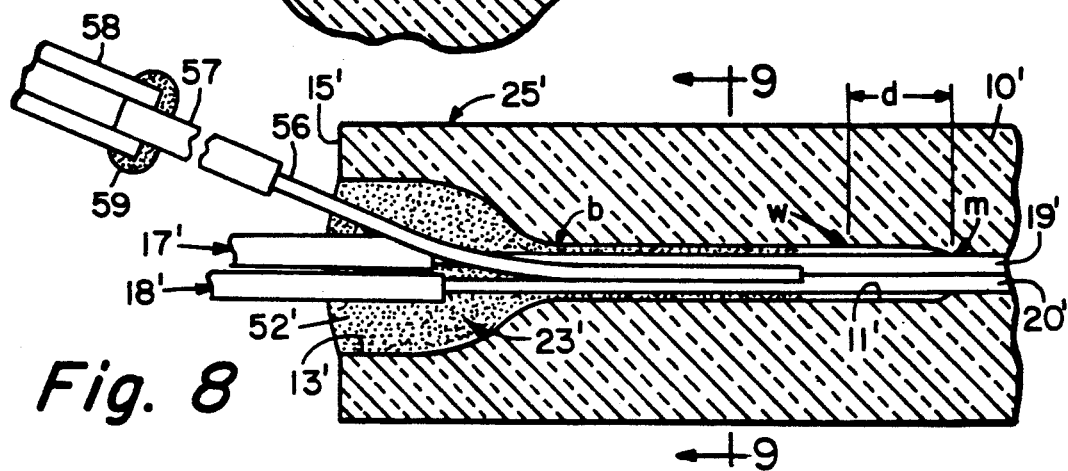
FIG. 8 is a cross-sectional view of an end region of a coupler showing a modification of the glue application technique.

In accordance with another aspect of the invention, the glue is drawn to some depth in cavity 23' above the bottom thereof but below the bottom b of funnel 13' before the wicking process begins. Referring to FIGS. 8 and 9, cavity 23' is evacuated by a hollow filament 56 to draw glue 52' deep into the cavity. Filament 56 is provided with a protective coating 57 so it can be more easily handled. The coated hollow filament is connected to a source of vacuum by inserting it into the end of evacuated tubing 58 and sealing the junction with glue 59. A sufficient length of coating 57 is removed from the end of filament 56 to permit the filament to extend to the desired depth in cavity 23'. As shown in FIG. 8, filament 56 extends to some point in cavity 23' remote from the bottom thereof. For example, the tip of filament 56 can extend just short of weakened region w of the fibers, so that when glue is applied, the glue will not cover weakened region w. Rather, the glue will thereafter wick down over the weakened region of the fibers but will not entirely fill the cavity. Alternatively, the glue could wick down from the solid region of glue to some point above region w and yet relieve stress from region w.

When a drop of glue 52' is placed in funnel 13', the low pressure provided by filament 56 pulls the glue to that depth within the cavity where the bottom of the filament is located. When the glue reaches the bottom of the filament, it flows into it and blocks the vacuum. Those portions of fibers 19' and 20' within cavity 23' are thus covered to the desired depth. For example, it may be desirable to flow the glue into the bore to a point about ¼ to ½ the distance from point b at the funnel bottom to point m at the start of the midregion.

After a sufficient period of time has elapsed for the wicking action to occur, the glue is cured by ultraviolet light, heat or the like. Hollow filament 56 can then simply be severed, thereby leaving a piece thereof in the cavity. Alternatively, it could be pulled out prior to curing the glue. The remaining portion of hollow filament can be reused by severing that end portion of the hollow filament that is filled with glue and stripping coating from the new end portion. Partially filling the bore is beneficial in that it places glue in the bore prior to the wicking process, thereby decreasing the wicking time and ensuring that the proper wicking action occurs.

Rather than wait for the glue to reach hollow filament 56 and block the vacuum, an operator can visually observe the flowing of the glue into bore 11'. When the glue reaches the desired depth, the vacuum can be discontinued.

The heating of the coupler intermediate product prior to inserting the glue into the funnel and/or the use of filament 56 to draw glue into the bore permits the use of higher viscosity glues than could otherwise be used. Some high viscosity glues contain glass particles to lower the expansion coefficient.

In accordance with another embodiment, glue is drawn to a desired depth in bore portion 11' and is cured before any appreciable amount of wicking occurs. If filament 56 is inserted to the bottom of bore portion 11', the fibers can be substantially covered by glue 52'. Indeed, in some couplers formed by this technique the cavity has been entirely filled with glue. At most, an extremely small air bubble remains at the bottom of the cavity when this technique is employed.

Alternatively, filament 56 could be inserted so that its tip extends to some point above the bottom of bore portion 11'. For example, the tip could extend to just beyond point w, so that when glue is applied, the glue will cover the weakened region w of the fibers but will not entirely fill the cavity.

EXAMPLE 1

A 1×2 fiber optic coupler was made in accordance with the following specific example, reference being made to FIGS. 1-7. The dimensions of glass tube 10 were: 3.8 cm length, 2.8 mm outside diameter, and 265 μm bore diameter. Each of the funnels 12 and 13 was formed by flowing the gas phase etchant $NF_3$ through the tube while uniformly heating the end of the tube. The depth of funnels 12 and 13 were about 1.71 mm, and their maximum diameters were about 1.81 mm. Coated fibers 17 and 18 consisted of 125 μm diameter single-mode optical fibers 19 and 20 having 250 μm diameter urethane acrylate coatings 21 and 22, respectively. A 6 cm long section of coating was removed from the end of a 1.5 meter length of coated fiber 18. An antireflection termination was formed on the end of fiber 18 by directing a flame at the center of the stripped region of fiber, while the end of the fiber was pulled and severed to form a tapered end. The tip of fiber 20 was heated by a burner flame to cause the glass to recede and form a rounded endface. The resultant stripped end region was about 3.2 cm long. Approximately 3.2 cm of coating was stripped from the central region of a 3 meter length of coated fiber 17.

Figure 6:
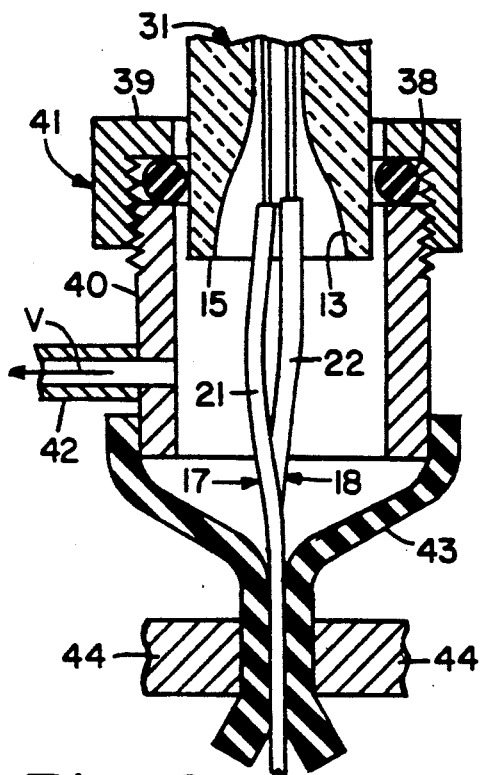
FIG. 6 is a cross-sectional view of an end of a coupler preform showing a vacuum attachment affixed to its end.

Tube 10 was inserted through ring burner 34 (FIG. 7) and was clamped to draw chucks 32 and 33 having motor controlled stages 45 and 46. Coated fiber 17 was inserted through bore 11 until its uncoated portion was situated below tube end surface 15. The uncoated portion of coated fiber 18 was held adjacent the uncoated portion of coated fiber 17, and both were moved together toward tube end 14 until the coating end regions were located in funnel 13, the uncoated fiber portions then being located intermediate end surfaces 14 and 15. The end of fiber 18 was located between midregion 27 and end 14 of tube 10. The fibers were threaded through the vacuum attachments 41 and 41', which were then attached to the ends of preform 31. Referring to FIG. 6, vacuum attachment 41 was slid over the end of tube 10, and collar 39 was tightened to compress O-ring 38 against the tube. Vacuum line 42 was connected to tube 40. One end of a length of thin rubber tubing 43 was attached to that end of vacuum attachment 41 opposite preform 31; the remaining end of the tubing extending between clamp jaws 44. Upper vacuum attachment 41' was similarly associated with line 42', tubing 43' and clamp jaws 44'. The coated portions of the fibers extended from tubing 43 and 43'. Vacuum was applied to coupler preform 31 by clamping jaws 44 and 44' on tubing 43 and 43'.

With a vacuum source connected to the tube bore, ring burner 34 was ignited, and its flames heated tube 10, causing tube midregion 27 to collapse onto fibers 19 and 20 as shown in FIG. 2. After the tube cooled, the burner was reignited to heat the center of the collapsed region to the softening point of the materials thereof. The flame was turned off, and stages 45 and 46 were pulled in opposite directions to elongate tube 10 and form neckdown region 24 (FIG. 3). After the coupler cooled, the vacuum lines were removed. The coupler remained in the chucks during the application of glue to cavities 23.

Clamps 44 and 44' were released from the flexible vacuum hoses 43 and 43', and nitrogen was supplied to hoses 42 and 42'. The turbulence created by the nitrogen flowing through tubes 43 and 43' enhanced the release of the fiber from those tubes. Upon completion of the nitrogen purge, vacuum attachments 41 and 41' were removed.

A MasterMite model #10008 heat gun was turned on and allowed to warm up. The heat gun was aimed at upper region of the coupler between burner 34 and chuck 32 while a distance of 14 cm was maintained between the gun and the coupler body. The heat was applied to the coupler body by alternating about every 5 seconds between the upper and lower regions of the coupler body for a total time of 1 minute.

A syringe was filled with Electrolyte UV cure epoxy resin code number 2728 UV manufacturered by Electronic Materials Inc. of New Milford, Conn. The applicator needle was inserted into the lower funnel 13 of the coupler preform, and the needle was carefully manipulated into the bottom region of the funnel. A sufficient amount of epoxy was injected into the funnel to fill it and cover the bare fibers. Care was taken to minimize the amount of glue that extended exterior to the funnel.

The epoxy application was then repeated at the upper funnel 12. After 2 minutes had passed, the epoxy in lower funnel 13 was subjected to a UV light source. The 2 minute lapse of time prior to initiation of the UV epoxy permits the glue to wick at least 3 mm beyond the funnel into the bore. The end of the UV wand was 3.25 mm from the surface of the intermediate product 25. The exposure time was that amount of time required to obtain a total exposure level of at least 58600.0 mj/cm$^2$ as measured at 0 mm from the detector surface. The curing procedure was repeated for upper funnel 12. The coupler body was then released from chucks 32 and 33. To ensure full initiation of the epoxy, the coupler was placed on a white background and was exposed to UV light from a Bondwand UV curing wand for a minimum of 15 minutes. The minimum output power of the Bondwand source was sufficient to provide a total of 110 mj/cm$^2$ over a 30 second test time interval.

The mechanical reliability of overclad fiber optic couplers made in accordance with this example have shown significant improvement over overclad fiber optic couplers glued by a "standard technique" whereby the funnel is filled with glue from a hypodermic needle, but insufficient time is allowed for wicking prior to curing the glue. Prior to using the improvement disclosed herein, a batch of hundreds of couplers were glued by the aforementioned standard technique. About 41% of those couplers failed when cycled twice between $-60°$ C. and 125° C. Failure was manifested by breakage of at least one of the coupler fibers. When the gluing method of the specific example was employed, only 3% of the couplers failed the same test. The couplers that did fail were typically non-conforming, i.e. they did not have wicked epoxy.

EXAMPLE 2

A 1×2 fiber optic coupler was made in accordance with Example 1, except that the end cavities were glued in accordance with the embodiment of FIGS. 8 and 9.

About 30 cm of 80 μm hollow silica filament 56 was provided. The filament had a 200 μm outside diameter coating of urethane acrylate. One end of the coated filament was glued in one end of a tube 58, the other end of which was adapted to be connected to a source of vacuum. About 2.5 cm of coating was stripped from the remaining end of the hollow filament. Filament 56 was inserted into cavity 23' until it reached the bottom thereof. A drop of Electrolite 2500 epoxy resin made by Electronic Materials Inc. of New Milford, Conn., was placed at end 15' of tube 10'. Cavity 23' was then evacuated through the hollow filament, thus causing the glue to flow down into cavity 23'. The glue then flowed a very short distance into the microtube until it reached a point where it blocked the vacuum and could flow no further. The glue was cured by exposure to ultraviolet light, and the coupler was removed from the chucks. The hollow filament was severed, the severed piece remaining in the cavity.

The mechanical reliability of overclad fiber optic couplers made in accordance with this example have also shown significant improvement over overclad fiber optic couplers glued by the aforementioned "standard technique". When the method of this example was employed, there was much less failure of couplers as a result of thermal cycling.

We claim:
1. A fiber optic coupler comprising
a plurality of contiguously extending optical fibers, said fibers extending through a coupling region and through the bore of a tube situated longitudinally adjacent said coupling region, said fibers being fused together in said coupling region, the diameters of said fibers in said coupling region being smaller than the diameters thereof in said tube,
a drop of glue completely surrounding said fibers at that end of said tube bore opposite said coupling region,
a bead of glue between at least one of said fibers and the adjacent wall of said tube bore, said bead extending from said drop of glue into said bore a distance of at least 30% of the total distance from said drop of glue to that end of said bore adjacent said coupling region.
2. The coupler of claim 1 wherein said bead extends into said bore at least 3 mm from said drop of glue toward said coupling region.
3. The coupler of claim 1 further comprising a funnel at that end of said tube bore opposite said coupling region, said drop of glue being located in said funnel.
4. A fiber optic coupler comprising
a plurality of contiguously extending optical fibers, said fibers extending through a coupling region and through the bore of a tube situated longitudinally adjacent said coupling region, said fibers being fused together in said coupling region, the diame- ters of said fibers in said coupling region being smaller than the diameters thereof in said tube, a drop of glue completely surrounding said fibers at that end of said tube bore opposite said coupling region, a bead of glue between at least one of said fibers and the adjacent wall of said tube bore, said bead extending from said drop of glue into said bore a distance of at least 3 mm from said drop of glue toward said coupling region.

5. A fiber optic coupler comprising an elongated body of matrix glass having first and second end surfaces, a midregion and first and second opposite end regions extending from said midregion to said first and second end surfaces, respectively, a plurality of optical fibers extending through said midregion, said fibers being fused together along with said midregion, the diameter of the central portion of said midregion and the diameters of said fibers in said central portion being smaller than the diameters thereof at said end regions, first and second longitudinal bore portions extending longitudinally from said midregion into said first and second end regions, respectively, first and second funnels connecting said first and second bore portions, respectively, to said first and second end surfaces, respectively, the bottom, small diameter regions of said funnels being adjacent said bore portions, at least one of said fibers extending through said first bore portion and said first funnel and from said first end surface, at least one other of said fibers extending through said second bore portion and said second funnel and from said second end surface, first and second drops of glue in said first and second funnels, respectively, said glue surrounding any of said fibers that extend through said funnels, a first bead of glue between at least one of the fibers that extends through said first bore portion and the adjacent wall of said tube bore, said first bead extending from said first drop of glue into said first bore portion at least 30% of the distance from the bottom of said first funnel to that end of said first bore portion adjacent said coupling region, and a second bead of glue between at least one of the fibers that extends through said second bore portion and the adjacent wall of said tube bore, said second bead extending from said second drop of glue into said second bore portion at least 30% of the distance from the bottom of said second funnel to that end of said second bore portion adjacent said coupling region.

6. The coupler of claim 5 wherein said first and second beads extend into said first and second bore portions, respectively, at least 3 mm from said first and second drops of glue, respectively, toward said coupling region.

7. A method of making a fiber optic coupler comprising forming an intermediate product composed of a plurality of contiguously extending optical fibers, said fibers extending through a coupling region and through the bore of a tube situated longitudinally adjacent said coupling region, said fibers being fused together in said coupling region, the diameters of said fibers in said coupling region being smaller than the diameters thereof in said tube, surrounding said fibers with a drop of glue at that end of said tube bore opposite said coupling region, the small diameter of said bore inhibiting the filling of said bore with said glue, flowing said glue by capillary action between at least one of said fibers and the adjacent wall of said bore to form a bead that extends at least 30% of the total distance from said drop of glue to that end of said bore adjacent said coupling region, and thereafter, curing said glue.

8. The method of claim 7 wherein the step of flowing comprises flowing said glue least 3 mm from said drop of glue into said bore.

9. The method of claim 7 wherein said intermediate product further comprises a funnel at that end of said tube bore opposite said coupling region, the step of surrounding said fibers with glue comprising applying glue to said funnel.

10. A method of making a fiber optic coupler comprising forming an intermediate product composed of an elongated body of matrix glass having first and second end surfaces, a midregion and first and second opposite end regions extending from said midregion to said first and second end surfaces, respectively, a plurality of optical fibers extending through said midregion, said fibers being fused together along with said midregion, the diameter of the central portion of said midregion and the diameters of said fibers in said central portion being smaller than the diameters thereof at said end regions, first and second portions of uncollapsed longitudinal bore extending longitudinally from said midregion into said first and second end regions, respectively, first and second funnels connecting said first and second bore portions, respectively, to said first and second end surfaces, respectively, at least one of said fibers extending through said first bore portion and said first funnel and from said first end surface, at least one other of said fibers extending through said second bore portion and said second funnel and from said second end surface, applying glue to said first funnel, allowing a sufficient period of time to elapse to permit said glue to flow by capillary action between all of said fibers that extend through said first bore portion and the adjacent wall of said first bore portion, said glue flowing at least 3 mm into said bore portion from the bottom of said funnel, that flow of said glue by capillary action failing to completely surround said fibers with glue, and thereafter, curing said glue.

11. The method of claim 10 further comprising the step of heating said tube prior to curing said glue.

12. The method of claim 10 wherein the step of heating said tube is performed prior to the step of applying glue to said funnels.

13. The method of claim 10 wherein said period of time is sufficient to permit said glue to flow by capillary action to the bottom of said bore portion adjacent said midregion.

14. The method of claim 13 further comprising the step of heating said tube.

15. The method of claim 14 wherein the step of heating said tube is performed prior to the step of applying glue to said funnels.

16. The method of claim 10 wherein, prior to the step of applying glue to said funnels, said method further comprises the step of inserting a hollow filament through said funnel and into said uncollapsed bore portion, said method further comprising the step of evacuating said filament to draw said glue into said uncollapsed bore portions due to the evacuated condition thereof, said glue being drawn a predetermined distance into said bore portion, the step of allowing a sufficient period of time to elapse permitting said glue to flow by capillary action deeper into said bore portion.

17. The method of claim 16 wherein the step of inserting comprises inserting said hollow filament such that the end thereof reaches said predetermined point in said bore portion, the step of applying glue causing said glue to fill the entire circumfirence of said bore portion from the bottom of said funnel to said predetermined point.

* * * * *